United States Patent [19]
Heynisch et al.

[11] 3,942,136
[45] Mar. 2, 1976

[54] TIME MULTIPLEX ELECTRON BEAM WITH MODULATING MEANS

[75] Inventors: Hinrich Heynisch, Graefelfing; Werner Veith, Munich, both of Germany

[73] Assignee: Siemens Aktiengesellschaft, Berlin and Munich, Germany

[22] Filed: May 31, 1974

[21] Appl. No.: 475,112

[30] Foreign Application Priority Data
June 4, 1973  Germany............................ 2328304

[52] U.S. Cl. .................. 332/21; 315/5.27; 332/25; 179/15 AP
[51] Int. Cl.² ......................................... H03C 3/34
[58] Field of Search ................. 332/13, 25, 21, 302; 325/320, 163; 315/4, 5, 5.24, 5.25, 5.26, 5.27, 5.28, 5.29; 179/15 A, 15 AP, 15 BM

[56] References Cited
UNITED STATES PATENTS

| | | |
|---|---|---|
| 2,516,886 | 8/1950 | Labin et al............................ 332/13 |
| 2,551,024 | 5/1951 | Levy.................................. 332/13 X |
| 2,553,566 | 5/1951 | Ferguson .......................... 332/25 X |
| 2,565,357 | 8/1951 | Donal ................................ 315/5.27 |
| 3,383,626 | 5/1968 | Harper et al...................... 332/25 X |
| 3,443,247 | 5/1969 | Fjerstad ............................. 332/302 |
| 3,784,799 | 1/1974 | Crandall et al. .................. 332/25 X |

*Primary Examiner*—Alfred L. Brody
*Attorney, Agent, or Firm*—Hill, Gross, Simpson, Van Santen, Steadman, Chiara & Simpson

[57] ABSTRACT

An electron beam tube for time multiplexing a plurality of signal channels on an extremely high frequency carrier includes an electron gun, a deflection system for causing the electron beam generated by the electron gun to sweep in a circular path past a plurality of individual electrodes which are excited with signals corresponding to the signals of individual channels, for modulating the beam with the channel signals, and a target for collecting the modulated beam to produce a time multiplexed output signal. The output signal may be amplified within the tube.

8 Claims, 5 Drawing Figures

TIME MULTIPLEX ELECTRON BEAM WITH MODULATING MEANS

BACKGROUND

1. Field of the Invention

This invention relates to time multiplexed systems and, more particularly, to an electron beam tube by which time multiplexing of an extremely high frequency carrier may be carried out.

2. The Prior Art

Time multiplexing of multichannel transmissions is a well known technique for combining the intelligence of a plurality of separate channels on a single carrier. Such systems are described, for example, in "Taschenbuch der Hochfrequenztechnik" by Meinke and Gundlach, 1956. In one method described therein, a plurality of individual channels are scanned by a revolving electronic switch or commutator, to give a train of pulses having amplitudes during successive time periods corresponding to individual channel signals. A carrier is then modulated with the pulse train by a modulator and transmitted to a receiver, where the signal is received and passed through a demodulator, and the resulting signal is demultiplexed into individual channels by means of a distributor which is synchronized with the commutator of the transmitter.

When the intelligence to be transmitted on the individual channels comprises binary signals, the carrier modulation employed is preferably phase shift keying two-phase modulation, sometimes hereinafter referred to as "PSK modulation." In this modulation technique, the signals are scanned by a commutator which revolves at a constant frequency, and a carrier wave is then phase modulated in such a way that signals representative of the binary 1 correspond to one phase and signals corresponding to a binary 0 correspond to another phase, shifted 180°, for example, relative to the first phase.

PSK modulation has been practical heretofore only with relatively low frequency carriers, and it has not heretofore been possible to utilize such a method with an extremely high frequency carrier such as 50 GHz or the like. The prior art has not been able to develop a sufficiently fast electronic switch which can be synchronized at the transmitter and receiver locations. If a 50 GHz carrier could be used, it would be possible to multiplex 16 channels of binary information, each having a pulse repetition rate of 250 MHz, by using an electronic switch operating at 250 MHz, producing a multiplexed signal of 4 GHz for phase modulating the carrier.

It is therefore desirable to provide a system by which PSK modulation may be applied to an extremely high frequency carrier in the range of 50 GHz.

SUMMARY OF THE INVENTION

It is a principle object of the present invention to provide a system for permitting the time multiplexing of a carrier having an extremely high frequency.

Another object of the present invention is to provide such a system employing an electronic beam tube used as a high speed electronic switch.

Another object of the present invention is to provide such a system employing an inertia-less switch by which individual channel signals are time multiplexed substantially without delay between successive channel signals.

In one embodiment of the present invention, an electron beam tube is employed as a switch and as a modulator and comprises particularly simple means by which a plurality of independent signal channels may be time multiplexed by modulating an electron beam at different positions within the electron beam tube to form a plurality of modulated beams, after which the modulated electron beams are collected to form a single output from the tube. In this way, a multichannel transmission can be carried out by PSK modulation employing a resistor as a load and a varactor diode in order to phase modulate an extremely high frequency carrier.

In another embodiment of the present invention, an electron beam tube is employed for amplifying the carrier wave as well as for multiplexing. This arrangement produces the advantage of permitting the use of a low power generator for the carrier wave instead of a relatively high power generator and, at the same time, achieving an advantageous signal-to-noise ratio.

One manner in which the amplifying function may take place within the electron beam tube is by employing two such tubes, each of which has an amplifier with an input from a low power carrier frequency generator, in operative relationship with the electron beam of the tube after it is collected, with the multiplexing functions of the two tubes taking place in push-pull fashion. The outputs of the two tubes are combined to form a single modulated carrier output signal, one of such outputs being passed through a phase inverter, so that the outputs from the two tubes are mutually reinforcing.

In another arrangement, the amplification is integrated into a single electron beam tube by employing a coupling unit juxtaposed with the electron gun of the tube for modulating the electron beam with the carrier and employing an amplifier within the tube in operative relationship with the collected electron beam.

These and other objects and advantages of the present invention will become manifest upon an examination of the following description and the accompanying drawings.

BRIEF DESCRIPTION OF THE DRAWINGS

Reference will now be made to the accompanying drawings, in which.

DESCRIPTION OF THE PREFERRED EMBODIMENTS

Figure 1:
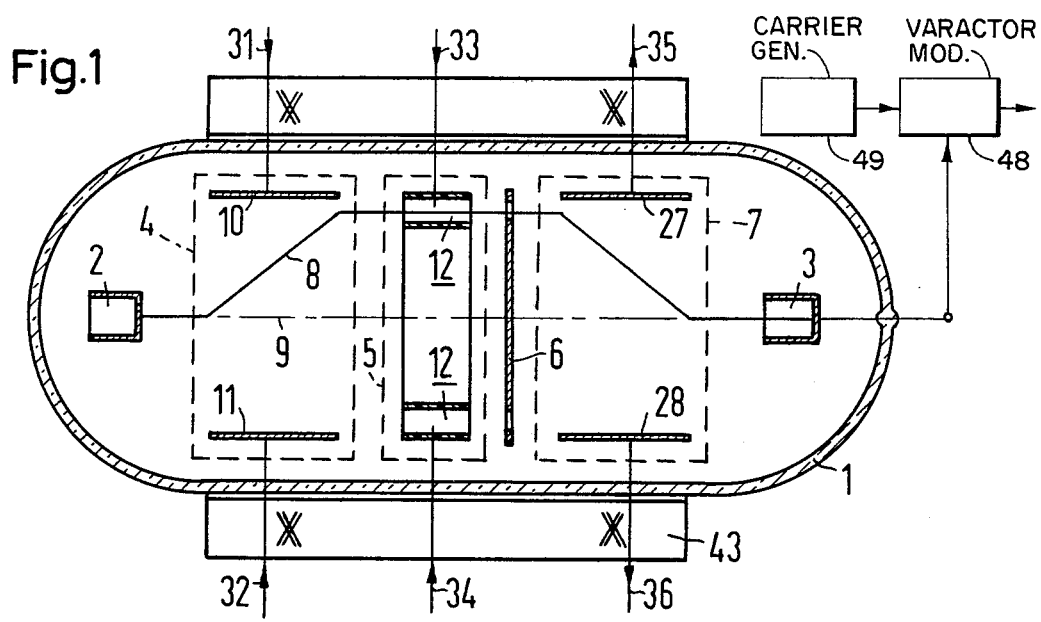
FIG. 1 is a diagrammatic view of an exemplary embodiment of the present invention, incorporating an electron beam tube and illustrating a longitudinal cross section through the axis of the tube.

Referring first to FIG. 1, there is shown a diagrammatic illustration of an electron beam tube 1 incorporating an electron gun 2 for generating an electron beam aligned with the axis 9 of the tube 1. The axis 9 passes through the electron gun 2 and a target 3 disposed at the opposite end of the electron beam tube from the electron gun 2. A first deflection device 4 is juxtaposed with the electron gun along the axis 9 and is provided for causing a deflection of the electron beam along a line 8. The function of the deflection device 4 is to cause the electron beam to sweep in a circle coaxial with the axis 9, but displaced radially outwardly therefrom. The circular sweeping of the electron beam is preferably carried out at a frequency which is synchronized with the availability of information supplied to the individual channels, as described in more detail hereinafter.

After passing through the deflection device 4, the electron beam passes through a coupling arrangement 5 and then through an aperture in a screen 6. The screen 6 has apertures aligned with the electron beam as it passes through individual spaces of the coupling arrangement 5, which are defined by electrode pairs 12. The screen 6 drains off electrons which diverge from the main streams of electrons passing through the spaces of the arrangement 5. After the electron beam passes through the screen 6, a second deflection device 7 causes the beam to return to the axis 9 of the tube, and thus functions to collect into a single beam the individual beams which pass through the several apertures in the screen 6.

A magnetic field generator, such as a coil 43, surrounds the electron beam tube 1 in the region of the deflection devices 4 and 7, the coupling arrangement 5, and the screen 6. The field is an axial or longitudinal magnetic field.

The deflection devices 4 and 7 preferably each take the form of a Cuccia coupler, which is well known for the coupling of fast cyclotron waves. Such a coupler consists, in one simple case, of two oppositely disposed deflection plates 10 and 11 extending parallel to the beam axis 9, with the plates 10 and 11 having a length equal to an integral multiple of the cylotron wavelength. The plates 10 and 11 are connected by lines 31 and 32 to an external high frequency source, the frequency of which is equal to the cyclotron frequency of the electron within the longitudinal magnetic field produced by the field generating means 43. The application of the RF frequency to the deflection plates 10 and 11 causes the beam to sweep in a circular pattern, as described.

Figure 4:
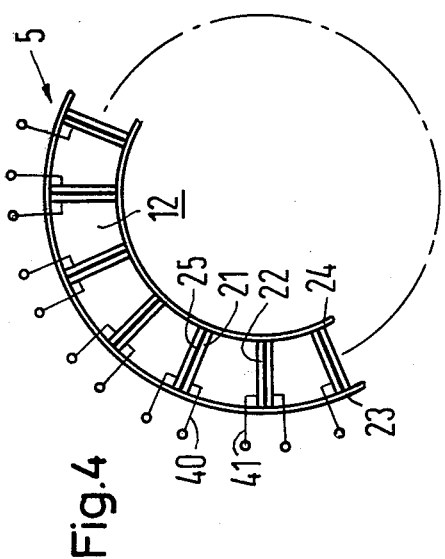
FIG. 4 is an elevation of the beam modulating assembly used in the apparatus of FIGS. 1 and 2.

An elevational view of the coupling arrangement 5 is illustrated in FIG. 4. It comprises a circular array of spaces defined by electrode pairs 12. One such pair includes plates 21 and 22, which are interconnected by lines 40 and 41 to a source of an individual channel signal.

The electrode pairs 12 are symmetrically arranged about the circle which is described by the beam by operation of the deflection device 4. Since the circular sweep of the beam is at a constant velocity, the beam is resident between the two plates of each pair for the same period of time. Each of the pairs 12 functions as a capacitor in a resonant circuit associated with an individual channel signal. The precise construction of such resonant circuit is not critical. Adjacent plates of adjacent pairs 12 are insulated from each other by sheets 25 of insulating material.

The lines 40 and 41 are energized to produce a transverse electrical field in the space between the electrode pairs, so as to deflect the electron beam entering the space between the plates. The beam is deflected so that it no longer passes through its aperture in the screen 6, but instead strikes the conductive screen 6, the energy of the beam being thereby dissipated. When a binary 0 is represented by an individual channel signal, no potential difference is applied to the lines 40 and 41, and the beam passes through the space between the pair 12, through the aperture in the screen 6, and reaches the target 3.

The second deflection device or collector 7 operates in the same manner as the deflection unit 4. It is coupled by means of lines 35 and 36 to a source of a high frequency signal synchronized with the signal applied to the lines 31 and 32, so that the beam is collected and returned to the axis 9 of the tube.

The total beam current received reaching the target 3 is modulated by the condition of the electrode pairs 12 in the coupling arrangement 5. The beam current is a time multiplexed signal which includes the information contents of all of the individual signals which control the voltage applied to the pairs 12. The output available at the target 3 is preferably used to phase modulate a carrier by using a varactor diode or the like in a conventional manner. As shown in FIG. 1, a varactor diode modulator 48 is connected to the target 3, and modulates a carrier produced by a carrier generator 49. When a varactor diode has a resistance on the order of 10 ohms and an operating voltage of about 5 volts is employed, a beam current in the tube 1 of about 500 mA is required. The electron beam tube 1 can produce the beam current of the required magnitude, but relatively efficient operation is then required of the deflection units 4 and 7. In order to maximize the efficiency of these deflection units, the lengths of the plates 10, 11, 27, and 28 are preferably equal to a multiple of the cyclotron wavelength, rather than being exactly equal to such wavelength. Tubes having less beam current than 500 mA may also be employed when amplification means is provided for increasing the output current to the 500 mA range. A suitable amplifier might be, for example, an electron induced conductivity unit or the like.

The size of the apertures in the screen 6 is not critical, as long as they are aligned with the beams passing through the spaces of the coupling arrangement 5. It is most important that the electrons which reach the target 3 all arrive at approximately the same time without any substantial delay, so that the individual channels remain distinct. A backward wave oscillator or a resonance backward wave oscillator may be employed as a high power carrier generator, to produce a carrier for modulation with the output of the target 3.

Figure 2:
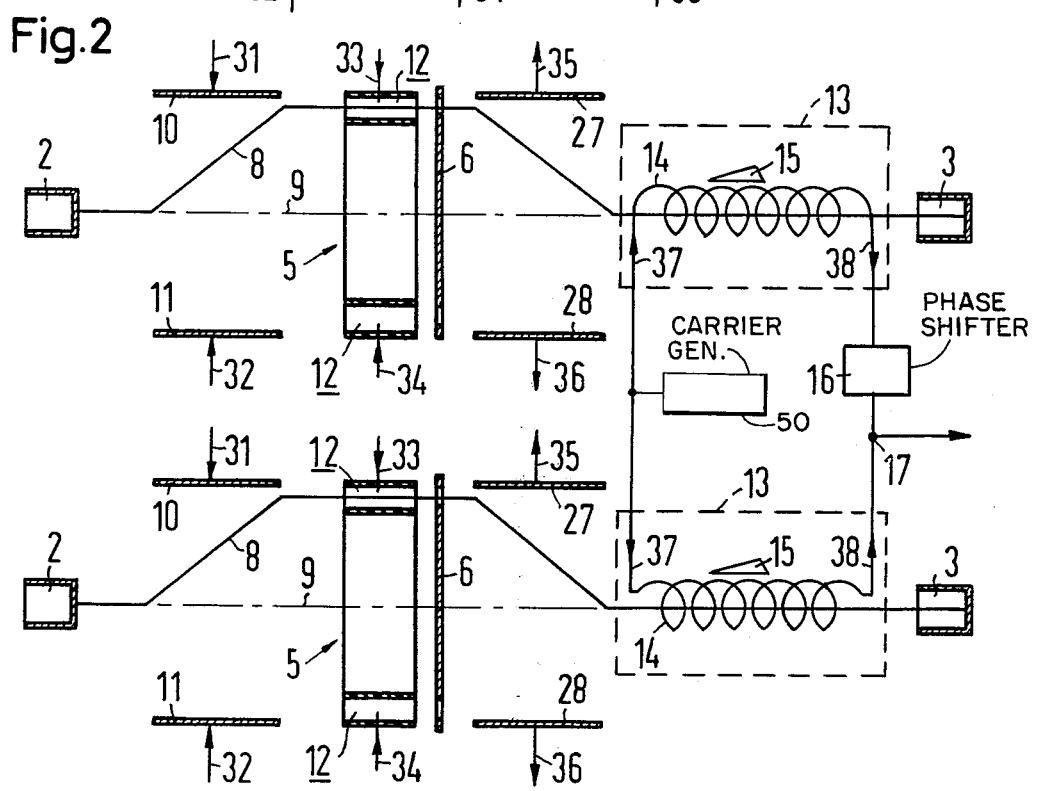
FIG. 2 is a diagrammatic illustration of an alternative embodiment of the present invention.
Figure 3:
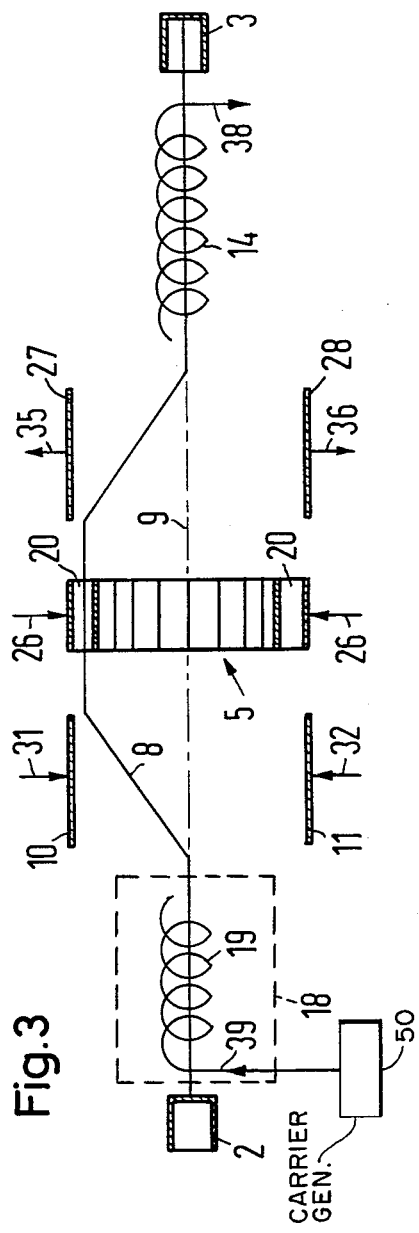
FIG. 3 is a diagrammatic view of yet another alternative embodiment of the present invention.

The embodiments shown in FIGS. 2 and 3 incorporate amplification devices into the structure of the electron beam tube itself. In the arrangement of FIG. 2, two electron beam tubes, each identical in construction to that illustrated and described in connection with FIG. 1, are provided, and these tubes are hereinafter referred to as the "upper" and "lower" tubes 1a and 1b. Both of these tubes are provided with an amplifier unit 13 interposed between the second deflection unit or collector 7 and the target 3. The amplifier unit 13 is preferably a tuned amplifier tuned to the frequency of the carrier. The amplifier unit 13 may be designed as a section of a travelling wave tube incorporating a delay line 14 and a damping path 15, having input and output circuits indicated by reference numerals 37 and 38. The structure of such apparatus is well known and so need not be described here. The input line 37 of the amplifier circuit 13 is connected to a low power carrier generator 50, and the amplifier unit 13 functions to amplify the carrier wave and simultaneously modulate it in accordance with the beam current passing along the axis 9 of the tube on its way to the target 3.

The coupling arrangements of the upper and lower tubes are identical, but the signals applied to the pairs 12 of the lower tube 1b are inverted before being applied to the corresponding pairs 12 of the upper tube 1a. That is, when one of the tubes functions to deflect the electron beam into the screen 6 as a result of a channel signal, the other tube permits it to pass to the target 3. The outputs of the two tubes are therefore 180° out of phase. The two outputs from the amplifier units 13 of the tubes 1a and 1b are connected together at a common point 17, but the output of the upper tube 1a is passed through a phase shifter 16, which shifts the phase by 180° so that the output signals are mutually reinforcing at the point 17. The electrical length of one or both of the delay lines 14 may be modified by adjustment of its electrical supply potential, to ensure that the two signals joined at point 17 are precisely in phase, thus ensuring the maximum output from the system.

The operation of the apparatus of FIG. 2 is particularly advantageous, since no additional phase modulator is required. Also, a carrier wave generator which is relatively low in power is adequate, and a very clean two-phase modulation of the carrier is obtained. However, it is necessary to undertake steps ensuring that the electron beams in each of the two tubes, after being collected and returned to the axis 9, are precisely parallel with the axis, because of the interrelationship of the collected beams with the delay lines 14.

One step which may be taken to ensure parallelism of the electron beam with each axis 9 is to employ a more intense longitudinal magnetic field in the area of the delay line 14, which tends to constrict the electron beam in this area. This also is desirable for operation of the delay line 14, so that no disadvantage results therefrom. The beam may also be passed through an aperture aligned with the delay line 14, to drain off electrons which are not moving in a direction parallel to the axis 9. The beam may also be influenced by magnetic and electric fields extending into or within the tube with the object of causing the beam to follow the desired path, by techniques which are known in the art.

The arrangement of FIG. 3 is one in which only a single tube is employed for housing the multiplex unit, the pulse modulator, and the amplifier.

Figure 5:
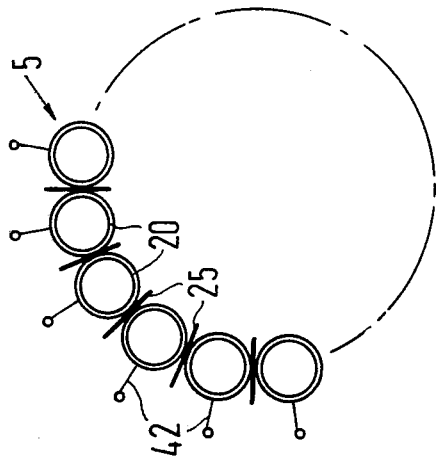
FIG. 5 is an elevation of the beam modulating assembly used in the apparatus of FIG. 3.

In the arrangement of FIG. 3, an input coupling unit 18 is interposed between the electron gun 2 and the deflection unit 4 and functions to modulate the electron beam 8 with the carrier frequency. The carrier signal may be generated in a relatively low power generator, and a delay line 19 is employed, connected to the carrier generator 50 by a line 39. The coupling arrangement 5 incorporates a plurality of cylinders 20, illustrated in elevation in FIG. 5. Each of the cylinders 20 is connected by a line 42 to a source of potential corresponding to the signal of an individual channel, and adjacent cylinders are insulated from each other by insulating sheets 25. The presence of a voltage on one of the lines 42 functions to speed up or slow down the electron beam as it passes through the cylinder associated with that line, so that the phase of the electron current flowing through the cylinder is modulated by the channel signal. The beam, after passing through one of the cylinders 20, is returned to the axis 9 by means of the second deflection unit or collector 7, after which it passes through an amplifier unit 13 on its way to the target 3. As in the arrangement of FIG. 2, the amplifier unit 13 may be constructed as a section of a travelling wave tube. The output of the amplifier unit 13 is available on a line 38, at which is provided the amplified and modulated carrier.

In the arrangement of FIG. 3, the speeding up and slowing down of the electron beam in the cylinders 20 interferes with the collection or return of all of the electrons to the axis 9. It is, therefore, desirable to arrange the elements of the tube so that the major portion of the electron beam is generally parallel with the axis 9 of the tube.

In the arrangements of all of the embodiments described above, Cuccia couplers are employed for the deflection units 4 and 7 for deflecting the electron beam away from the axis 9 and for subsequently returning the beam to the axis 9. When a cyclotron wave is employed with such a coupler, the electrons revolve on spiral shaped paths, even though the beam as a whole describes a circular sweeping movement. For this reason, if the electrodes 10 and 11, for example, are not short in the direction of the beam axis, it is preferable to form them in a twisted form. It is possible, however, to use a synchronous wave instead of a cyclotron wave to sweep the electron beam and, in such a case, the electrons move parallel with the beam without any spiral motion. Consequently, when a synchronous wave is employed, the apparatus of the present invention may be constructed more simply. Synchronous waves can be generated relatively easily by employing a cyclotron wave coupler with a subsequent jump or reversal of the magnetic field, as known in the art.

The Cuccia-type deflection units described herein are relatively simple and extremely narrow banded. Wide banded couplers may be used as an alternative to the Cuccia units when the electron beam tube operates with relatively high electron currents. Then a cyclotron wave may be advantageously employed with negligible dispersion. Such couplers are already known in the art and are described, for example, in the German Auslegeschrift No. 1,516,393. As such couplers require a relatively intense magnetic field, they result in a better focusing of the electron beam.

Although the present invention has been described particularly in terms of the transmitting end of a communications network, it will be understood that a demultiplexing of the multiplexed signal may be carried out at the receiving end by employing an electron beam tube similar to those illustrated and described above, in which case the presence of an electron current passing through the space between the electrode pairs 12 or through the cylinders 20 is sensed by conventional means and used to reconstitute each individual channel signal. The speed with which the electron beam is caused to move in a circular sweeping motion is the same in the transmitter and receiver locations and is synchronized by known techniques.

It will be apparent to those skilled in the art that various modifications and additions may be made in the apparatus described above without departing from the essential features of novelty thereof, which are intended to be defined and secured by the appended claims.

What is claimed is:

1. Multiplexing apparatus for time multiplexing a plurality of individual channels, comprising a pair of electron beam tubes, each of said tubes having an electron gun located at one end of the tube and a target disposed at the other end of the tube, a first deflection device for deflecting the electron beam and causing said electron beam to sweep in a circle coaxial with the line between said gun and said target, a coupling arrangement interposed between said deflection device and said target, said coupling arrangement comprising a separate electrode for each of said channels distributed symmetrically about said circle, each of said electrodes being electrically connected to receive a signal corresponding to one of said individual channels for modulating the electron beam in accordance with said individual signals at one position during the circular sweep of said electron beam, a second deflection device interposed between said coupling arrangement and said target for returning the beam to a path between said electron gun and said target, and an amplifier unit interconnected between said second deflection device and the target of each of said tubes, means for connecting a carrier signal to said amplifier for producing a carrier modulated in accordance with the signals of the individual channels, means for supplying a channel signal representative of an individual channel in push-pull to corresponding electrodes of the coupling arrangements of said two tubes, and means for connecting the outputs of said amplifiers to a common terminal, said last named means including a 180° phase shifter interconnected between one of said amplifer units and said common terminal.

2. Apparatus according to claim 1, including a screen interposed between said coupling arrangement and said second deflection means for allowing only unmodulated electrons of said beam to reach said target.

3. An electron beam tube for time multiplexing a plurality of individual channels comprising an electron gun located at one end of said tube and a target disposed at the other end of said tube, a first deflection device for deflecting the electron beam and causing said electron beam to sweep in a circle coaxial with the line between said gun and said target, a coupling arrangement interposed between said deflection device and said target, said coupling arrangement comprising a separate electrode for each of said channels distributed symmetrically about said circle, each of said electrodes being electrically connected to receive a signal corresponding to one of said individual channels for modulating the electron beam in accordance with said individual signals at one position during the circular sweep of said electron beam, a second deflection device interposed between said coupling arrangement and said target for returning the beam to a path between said electron gun and said target, an input coupling unit interposed between said electron gun and said first deflection device for modulating the electron beam in accordance with a carrier frequency, and an amplifier interposed between said second deflection device and said target.

4. Apparatus according to claim 3, wherein said input coupling unit and said amplifier are sections of a travelling wave tube.

5. Apparatus according to claim 3, wherein said coupling arrangement comprises a plurality of cylinders for conducting said electron beam between said deflection unit and said target, and means for connecting each of said cylinders to a potential corresponding to the signal of an individual channel.

6. Apparatus according to claim 1, wherein said coupling arrangement comprises a plurality of electrode pairs, one for each of said individual channels, and means for connecting the electrodes of each pair to a source of a potential difference corresponding to the signal of an individual channel.

7. Apparatus according to claim 1, including an amplifier unit interposed between said coupling arrangement and said target, said amplifier unit incorporating a section of a traveling wave tube.

8. Apparatus according to claim 1, wherein said deflection device comprises a Cuccia coupler.

* * * * *